May 6, 1941. F. ROSKOS 2,240,913
ELECTRIC HEATING TORCH
Filed Jan. 25, 1940 2 Sheets-Sheet 1
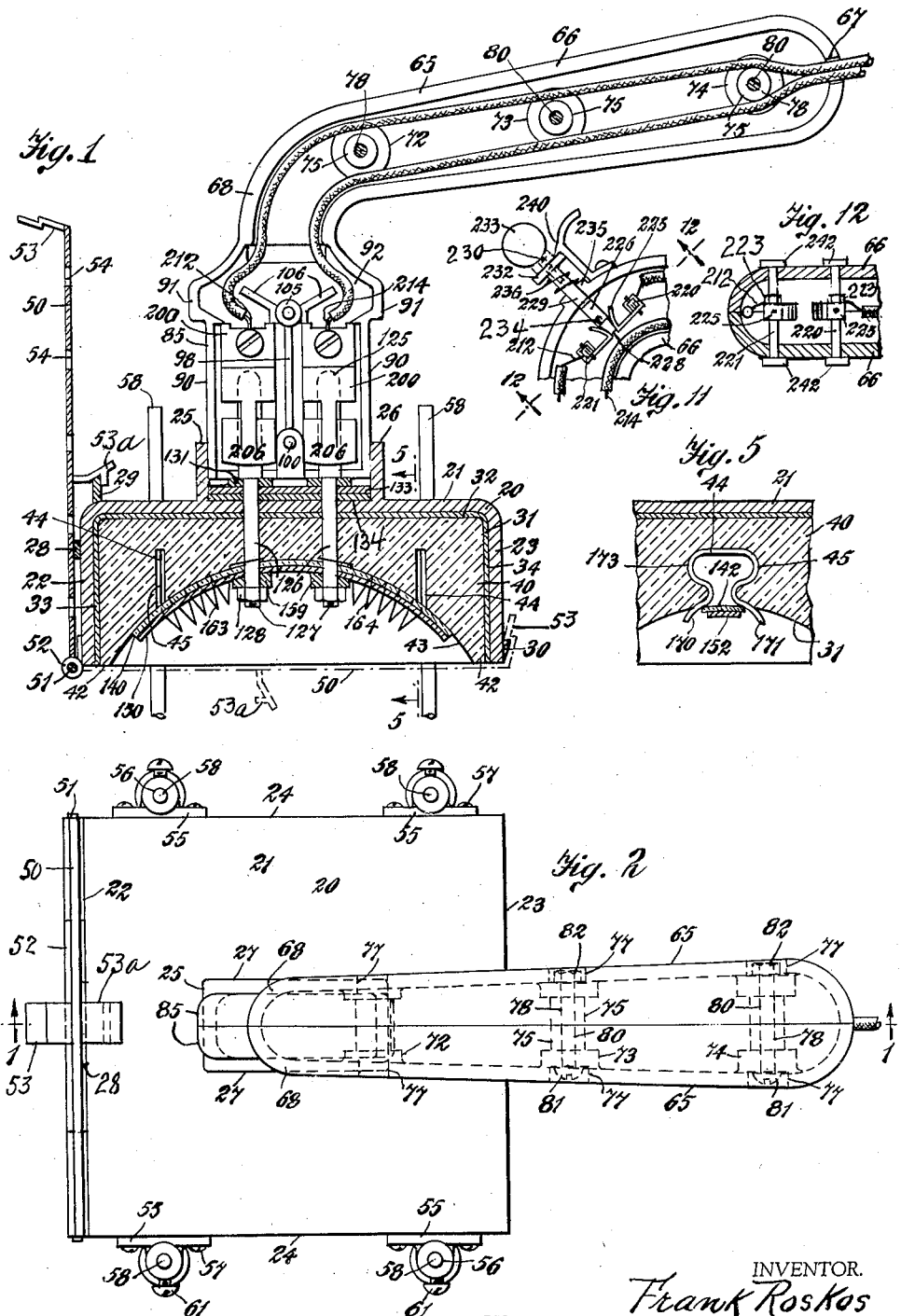
INVENTOR.
Frank Roskos
A. A. de Bonneville
ATTORNEY.

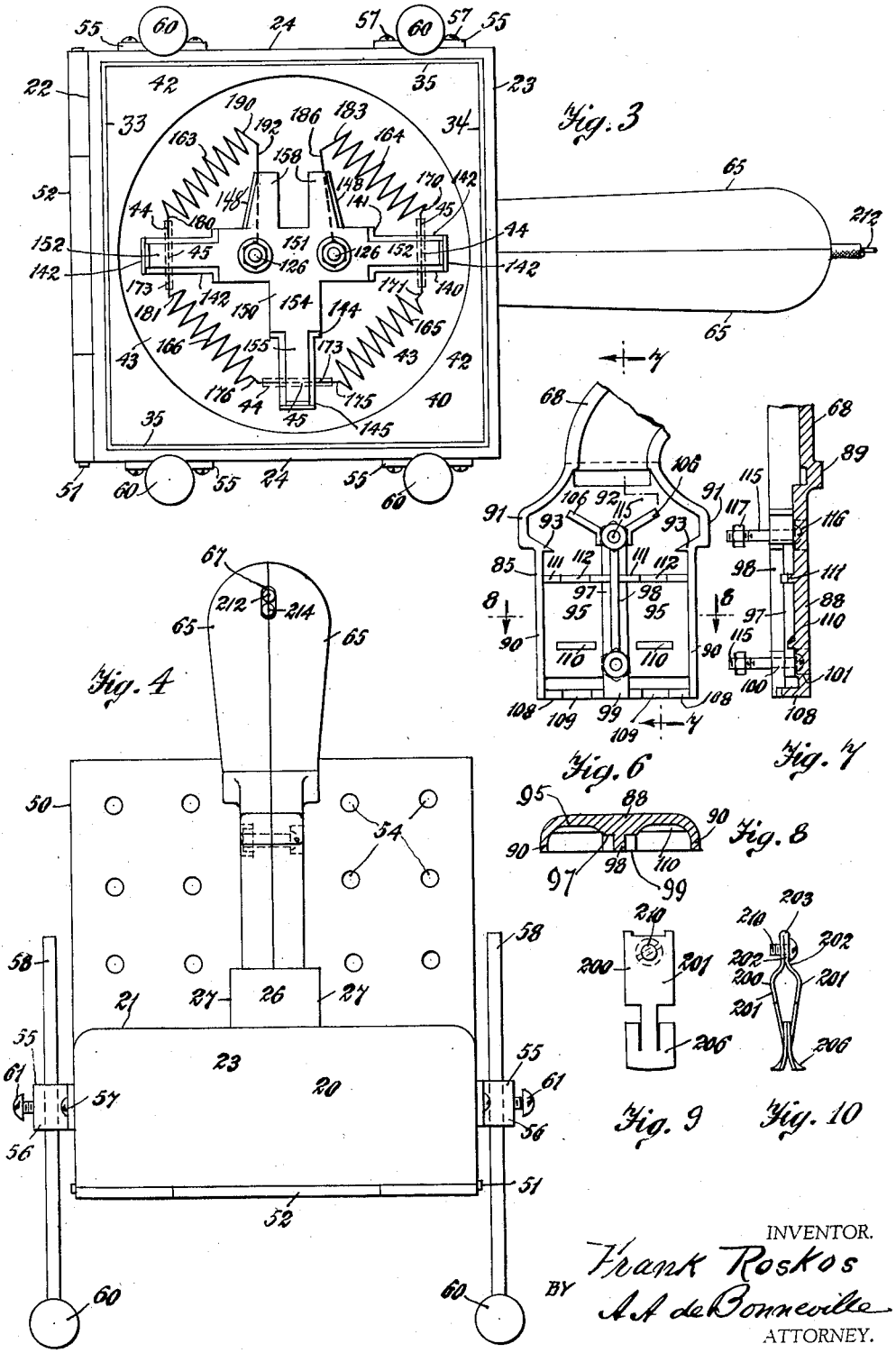

Patented May 6, 1941

2,240,913

UNITED STATES PATENT OFFICE 2,240,913

ELECTRIC HEATING TORCH

Frank Roskos, Bayonne, N. J.

Application January 25, 1940, Serial No. 315,552

4 Claims. (Cl. 219—29)

This invention relates to an electric heating torch.

The object of the invention is the production of a torch which is specially adapted to heat paint and the like on various objects, and which is required to be removed, the heat of the torch blistering the paint, to easily scrape it from said objects.

The second object of the invention is the production of an electric heating torch, that has provided therefor, helical wire heating coils that coact with a refractory heat support having a parabolic reflecting surface.

The third object of the invention is the production of an electric heating torch with a parabolic reflecting surface and heating coils outside of said surface, to enable all portions of the coils to easily reflect heat when said coils are electrically energized.

Various other objects of the invention will be evident from the specification and drawings herewith.

In the accompanying drawings Fig. 1 represents a section on the line 1, 1 of Fig. 2, of an exemplification of the improved electric heating torch; Fig. 2 shows a top view of Fig. 1; Fig. 3 indicates a bottom view of Fig. 1; Fig. 4 represents a left hand view of Fig. 1; Fig. 5 shows a section of Fig. 1 on the line 5, 5; Fig. 6 indicates a fragmentary portion of Fig. 1; Fig. 7 is a section of Fig. 6 on the line 7, 7; Fig. 8 represents a section of Fig. 6, on the line 8, 8; Fig. 9 indicates an elevation of a clamping member of the switch of the torch; Fig. 10 shows a right hand view of Fig. 9; Fig. 11 represents a fragmentary portion of Fig. 1, with a modification; and Fig. 12 shows a partial section of Fig. 11, on the line 12, 12.

The heating torch in this exemplification comprises the cup shaped shell of metal designated in its entirety by the numeral 20, which comprises the top wall 21, the front wall 22, the rear wall 23, and the side walls 24.

A clamping pocket having the front wall 25, the rear wall 26, and the side walls 27, extends from the top wall 21 of the shell 20. Stop lugs 28, 29 and 30, extend from the shell 20.

An insulating hood 31, of asbestos having the top wall 32, the front wall 33, the rear wall 34, and the side walls 35, is shown bearing against the inner faces of the walls of the shell 20.

A refractory heat reflecting support, in this instance of porcelain, designated in its entirety by the numeral 40, is positioned in the shell 20, and bears against the hood 31. The outer faces of the support 40, are shown with the flat end portions 42, and the parabolic reflecting face 43.

Knob shaped clamping pockets 44, are indicated in the support 40, and wire knob shaped clamping brackets 45, are detachably supported in the pockets 44.

To the open end of the shell 20, is hinged a cover 50, by means of the hinge rod 51, which latter is rotatively supported in the bracket 52, secured to the front wall 22, of the shell 20. Locking latches 53, and 53a, extend from the cover 50, and said cover 50 has extending therethrough the openings 54. It will be noted in Fig. 1, that the cover 50, is indicated in its open position in full lines and in its closed portion in dotted lines.

To the side walls 24, of the shell 20, are fastened the guide brackets 55, having the openings 56, by means of the screws 57. Adjusting rods 58, with the spherical heads 60, are supported in the openings 56, and are clamped in predetermined positions by the screws 61, which latter are in threaded engagement with the brackets 55.

A combined handle and switch box comprises the identical members indicated in their entireties by the numerals 65, and are of heat refractory material, in this instance Bakelite.

Each member 65, comprises the hollow tapered cylindrical handle with the wall 66, and which at their outer ends are indicated with the opening 67, and at their other ends are shown with the curved portions 68.

From the inner faces of the walls 66, of the members 65, extend the three bosses 72, 73 and 74, and from each of the latter extends the boss 75. In each of the walls 66, are indicated openings 77, which join with the openings 78, in the bosses 72, 73, 74, and 75. A bolt 80, with the head 81, at one end and the nut 82, at the other end extends through each of the openings 78, and detachably clamp the walls 66, together.

From the curved portions 68, extend the body portions of the switch box, each designated in its entirety by the numeral 85. Each of the body portions 85, comprises the outer wall, 88 which at its upper end has formed therewith the extension 89, which joins with the curved portions 68, of the handle. The wall 88, is indicated with the parallel longitudinal ends 90, which join with the extended portions 91, to form the chamber 92. Extensions 93, are formed with the upper portions of the ends 90. The inner faces 95, of the wall 88, are curved as indicated. At the central portion of the inner faces of the wall 88, is indicated the extension 97, and from the latter extends the longitudinal rib 98. The latter at its lower end joins with the wider portion 99.

In the latter is found a cylindrical opening 100, which terminates in an hexagonal opening 101.

At the upper end of the rib 98, is indicated a hub 105, from which extend the wings 106.

At the lower ends of the walls 88, inwardly project the supporting ends 108, having the concaved central portions 109. Horizontal ribs 110, and the horizontal ribs 111, with the central concaved portions 112, extend from the inner faces 95, of the walls 88. Bolts 115, extend through the openings 100 and are indicated having the heads 116, and the nuts 117. The said bolts 115, detachably maintain the portions 85, of the switch box in clamped position.

In the portions 85, of the switch box are positioned a pair of switch plugs 125. Each switch plug 125, has integral therewith the bolt end 126, somewhat smaller in diameter and having the threaded end 127, for the nut 128.

The lower ends of the body portions 85, of the switch box extend into the clamping pocket having the side walls 27. A washer 131 encircles each of the bolt ends 126, and bears up against the lower end of the coacting switch plug 125.

A plate 133, of metal is supported on the bolt ends 126, below the washers 131, and a plate 134, of mica is also supported on the bolt ends 126, below the plate 133, and bears upon the outer face of the top wall 21, of the shell 20.

A cross shaped plate of mica, designated in its entirety by the numeral 140, and having parabolic faces. comprises the longitudinal body portion 141, with the end portions 142, the central cross-wise portion 144, with the end portion 145. and the tapered end portions 148.

Upon the plate of mica 140 bears the cross shaped clamping plate 150 of metal having parabolic faces. The clamping plate 150 comprises the longitudinal body portion 151, with the end portions 152, the central crosswise portion 154, with the end portion 155, and the tapered crosswise end portions 158.

Washers 159, with parabolic inner faces are supported on the bolt ends 126, and are held in place by the nuts 128.

Helical wire heating coils 163, 164, 165, and 166, are circumferentially supported in series upon the parabolic reflecting face 43, of the porcelain support 40. The adjacent ends 170, and 171, of the coils 164 and 165, are connected by the knob shaped wire connection 173, see Fig. 5, and which latter is tightly forced into one of the pockets 44, and the adjacent portion 142, of mica bears on the ends 170, and 171, of said coils 164, and 165.

In a similar manner the end 175, of the coil 165, and the end 176, of the coil 166, have connected thereto a knob shaped connection 173, which is secured in its adjacent clamping pocket 44. In a similar manner the ends 180, and 181, of the coils 163 and 166, are connected by a knob shaped wire connection 173, which is also tightly forced into the adjacent pocket 44. From the end 183, of the coil 164, extends the wire 186, which is led under the plate of mica 140, and wound around one of the bolt ends 126. From the end 190, of the coil 163, extends the wire 192, which is led under the plate of mica 140, and wound around the other bolt end 126.

Within the body portions 85, of the switch box are positioned a pair of switch clamping members, designated in their entireties by the numerals 200, and which coact with the switch plugs 125. For details see Figs. 9 and 10. Each clamping member 200, comprises a body portion with the inclined flexible members 201, which have the upper parallel portions 202, and the latter join at their upper ends 203. The lower portions of the members 201, have integral therewith the clamping wings 206.

A screw 210, extends through the parallel upper portions 202.

Wires 212 and 214, for electric current extend through the members 65, of the handle and the switch box and can bear on opposite sides of the bosses 75, between the bosses 72, 73, and 74, and leave the handle through the opening 67. From the latter the wires 212, and 214, extend to a connecting plug of a source of electric current not shown. The wires 212, and 214, are fastened to the clamping members 200, by means of the screws 210.

It will be noted that the upper ends 203, of the clamping members 200, bear against the extensions 93, of the body portions 85, of the switch boxes.

Referring to Figs. 11 and 12, the walls of the handle are again indicated at 66, and the wires of the torch are again indicated at 212 and 214.

An independent operating switch is provided for the wire 212. The latter switch comprises a pair of cross rods 220 and 221 of metal and square in cross section, which are tightly supported at their ends in the members 65, of the handle. A portion of each of the rods is cylindrical for the nuts 223.

To each of the rods 220, and 221 is fastened a curved clamping wing 225, for the independent operating switch. The plug 226, is indicated with the tapered lower end 228, of metal which is connected to the stem 229, of heat refractory material, preferably rectangular in cross-section and having the threaded pin 230, extending therefrom. A washer 232, of metal bears on the shoulder between the stem 229, and the pin 230. A spherical shaped operating head 233, of heat refractory material is in threaded engagement with the pin 230. A stop pin 234, extends through the plug 226. A boss 235 is formed with one of the walls 66, for the stem 229. A helical spring 236, encircles the stem 229, and bears between the washer 232, and the boss 235. A spring latch having the locking jaw 240, is fastened to the adjacent wall 66. The locking jaw 240, coacts with the washer 232. Discs 242, of Bakelite or other heat refractory material are fastened to the walls 66, over the openings for the cross rods 220, and 221. The adjacent ends of the wire 212, are fastened to the rods 220 and 221, by means of the nuts 223.

To use the electric heating torch the body portions 85, of the switch box with their contents and connected together by the bolts 115, and the walls 66, of the handle, are connected by the bolts 80. The switch box is then inserted into the clamping pocket having the side walls 27. The nuts 128, are then screwed up in place and the helical heating wire coils 163, 164, 165 and 166, are securely positioned in place. The adjusting rods 58, are clamped in proper operative position by means of the screws 61, to position the shell 20, the proper distance from the surface operated upon, and either parallel or inclined thereto. The wires 212, and 214, are then connected to the source of electric current not shown. The cover 50, is then swung to its open position as indicated in Fig. 1, with the locking latch 53a in locking engagement with the stop plug 29. The spherical operating head 233, of the independent operating switch is pushed down to position the tapered lower end 228, of the plug 226, to bear against the wings 225, and the electric circuit for electric heating torch is thereby closed. The operator then grasps the members 65, of the handle and moves the torch with the open end of the reflecting support 40, opposite the surface of the object operated upon to heat the same. The paint on said surface is heated so that it is blistered, when it can be easily scraped from the surface of the object operated upon.

Various modifications may be made in the invention and the present exemplifications are to be taken as illustrative and not limitative thereof.

Having described my invention I claim:

1. In an electric heating torch the combination of a cup shaped shell, a refractory heat reflecting support positioned in said shell and having a parabolic reflecting face, helical heating coils bearing on said parabolic reflecting face, a switch box detachably supported on the top wall of said shell, switch plugs detachably supported in said switch box, a switch clamping member for each switch plug in said switch box, each switch plug having a bolt end integral therewith extending through the heat reflecting support, a plurality of helical heating coils in series with one another bearing on the parabolic reflecting face of said heat reflecting support, a wire extending from the adjacent ends of a pair of said coils, and connected to said bolt ends, means to maintain said coils to bear against the reflective face of the reflecting support and means to electrically energize said switch plugs.

2. In an electric heating torch the combination of a cup shaped shell, a refractory heat reflecting support positioned in said shell and having a parabolic reflecting face and having a plurality of knob shaped clamping pockets extending therein from its reflecting face, a knob shaped wire connection tightly positioned in each clamping pocket, a plurality of helical heating coils bearing on the reflecting face of said reflecting support, a switch box supported on said shell, a pair of switch plugs in the switch box and each switch plug having a bolt end integral therewith, the latter extending through the heat reflecting support, one end of a pair of said heating coils connected to said bolt ends, one end of each of said heating coils in connection with one of said knob shaped wire connections and means to electrically energize said switch plugs.

3. In an electric heating torch the combination of a cup shaped shell, a refractory heat reflecting support positioned in said shell and having a parabolic reflecting face and having a plurality of knob shaped pockets extending therein from its reflecting face, a knob shaped wire connection tightly positioned in each knob shaped clamping pocket, a plurality of helical heating coils in series with one another bearing on the parabolic reflecting face of said reflecting support, a switch box detachably supported on said shell, a pair of switch plugs detachably supported in the switch box and having a bolt end integral therewith, the latter extending through the heat reflecting support, one end of a pair of said heating coils connected to said bolt ends, one end of each of said heating coils in connection with one of said knob shaped wire connections, a plate of mica having parabolic faces bearing on the parabolic reflecting face of the heat reflecting support, and bearing on the wires connecting and extending from said helical heating coils, a clamping plate of metal having parabolic faces bearing on said plate of mica, said bolt ends extending through said plate of mica and said plate of metal, washers having one of their faces parabolic bearing on said plate of metal and nuts for the bolt ends to clamp them and their switch plugs in operative position.

4. In an electric heating torch the combination of a cup shaped shell, a heat insulating hood bearing against the inner faces of said shell, a heat refractory reflecting support positioned in said insulating hood, said shell having a clamping pocket extending from the outer face of its top wall, a switch box of heat refractory material detachably positioned in said clamping pocket, a hollow handle of heat refractory material extending from and integral with said switch box, a pair of switch plugs in said switch box, each of said plugs having a bolt end integral therewith, a plurality of helical wire heating coils bearing on the outer face of said heat refractory reflecting support in connection with said bolt ends, wires extending from said switch plugs leading through said switch box and handle, and from the latter extending to a source of electric current, an operating switch in said handle for one of the wires extending therethrough, an operating head outside of said handle for said operating switch, a cover having openings therethrough hinged to the open end of said cup shaped shell, means to maintain said cover in its open position and means to maintain said cover in its closed position.

FRANK ROSKOS.